UNITED STATES PATENT OFFICE.

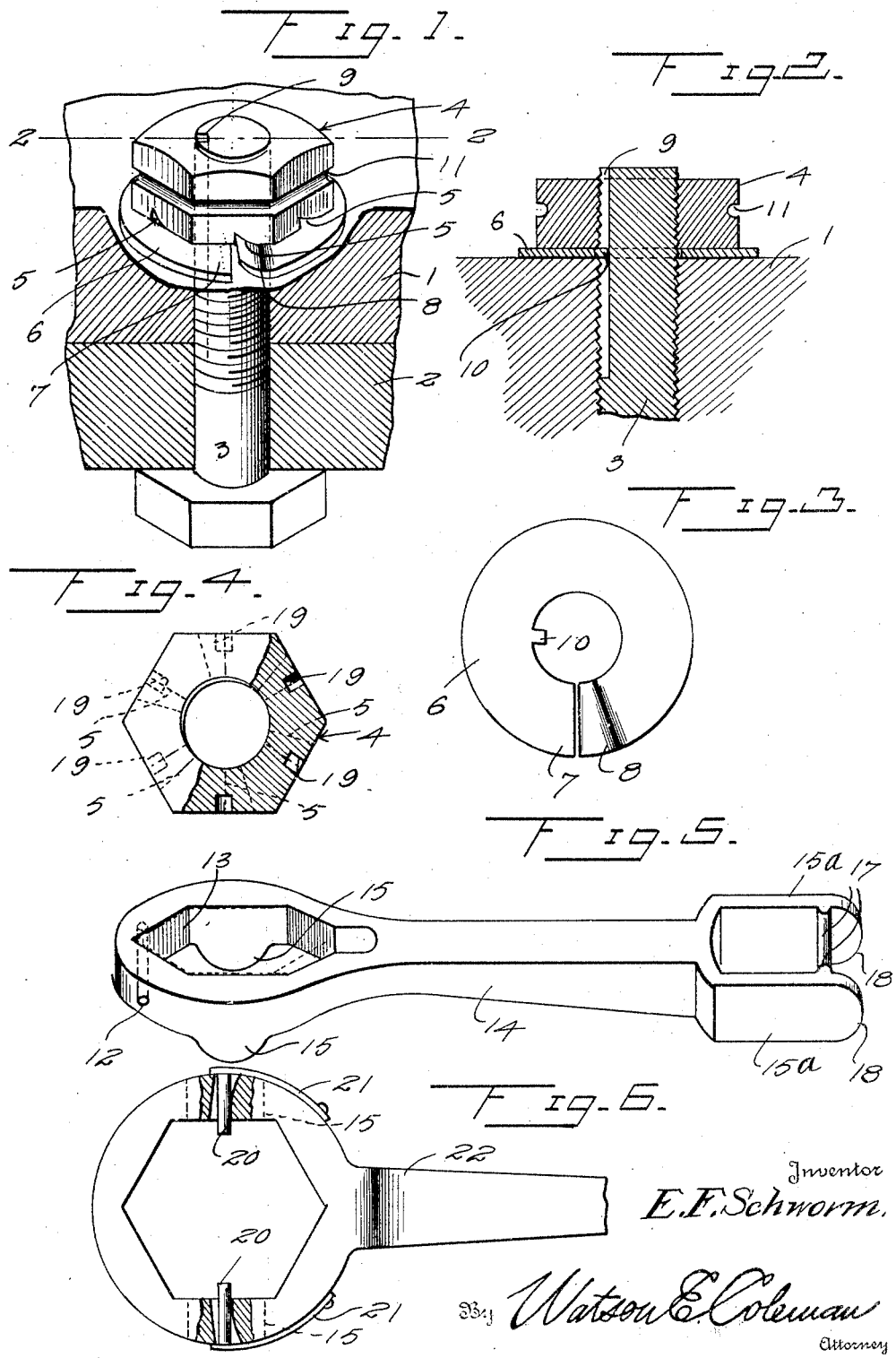

EDWARD F. SCHWORM, OF GRANT TOWNSHIP, GRAND TRAVERSE COUNTY, MICHIGAN.

NUT-LOCK.

1,334,804.   Specification of Letters Patent.   Patented Mar. 23, 1920.

Application filed September 27, 1919. Serial No. 326,772.

*To all whom it may concern:*

Be it known that I, EDWARD F. SCHWORM, a citizen of the United States, residing at Grant township, in the county of Grand Traverse and State of Michigan, have invented certain new and useful Improvements in Nut-Locks, of which the following is a specification, reference being had to the accompanying drawings.

This invention relates to an improved nut lock, and an object of the invention is the provision of a device of this kind including means to prevent unscrewing of the nut on the end of a bolt, and furthermore to provide a device for this purpose, which is simple, efficient and practical and may be sold at a reasonable profit as compared to its relatively low cost of production.

Another object of the invention is to provide a nut locking device comprising a split spring washer mounted upon the bolt, intermediate the nut and a member to be clamped, whereby its split ends may coöperate with ratchet means on one face of the nut to lock the nut in position, there being improved means of connection between the washer and the bolt to prevent movement of the washer.

A still further object of the invention is the provision of means carried by the nut, to be engaged by an element, to hold the element in a position relatively to the nut so that the means which is carried by the element may actuate one of the split ends of the washer in order to disconnect it from the ratchet teeth of the nut, whereby the nut may be removed.

A further object of the invention is to provide a nut locking device especially constructed, so as to be actuated and released by means of a particular form of wrench element, set forth, illustrated and claimed in the co-pending application in the name of Edward F. Schworm, filled September 27, 1919, Serial Number 326,773.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view of the improved nut lock constructed in accordance with the invention.

Fig. 2 is a sectional view on line 2—2 of Fig. 1.

Fig. 3 is a detail view of the lock washer.

Fig. 4 is a detail view of a modified form of nut.

Fig. 5 is a detail view of an element such as a wrench, adapted for connection with the nut, whereby a split end of the washer may be operated to disengage the teeth of the nut so that the nut can be removed.

Fig. 6 is a detail view of a modified form of wrench element.

Referring more especially to the drawings, 1 and 2 designate a pair of members to be clamped by means of a bolt 3 which passes through the members and is provided with a nut 4 threaded thereon. One face of the nut is provided with a plurality of radial ratchet teeth 5 and interposed between the toothed face of the nut and one of the members which is clamped in position is a lock washer 6 and has split ends 7 and 8, the former lying flat relative to the ratchet face of the nut, while the other is offset or deflected, and is yieldable, so as to ride over the ratchet teeth and into engagement therewith, to prevent the nut 4 from unscrewing. The shank of the bolt is provided with an elongated groove 9 extending longitudinally of the shank. This groove receives a radial lug 10 projecting from the marginal edge of the opening of the washer, to prevent the washer from turning relatively to the bolt. When the nut 4 is applied to the shank of the bolt, with the washer between it and one of the members to be clamped, and then threaded home, the yieldable end 8 of the washer engages one of the ratchet teeth and prevents the nut from unscrewing. The nut in Fig. 1 is provided with a channel 11 in surrounding relation to the surface of the nut. This channel is designed to be engaged by a transversely disposed pin 12, which is disposed adjacent one end of the enlarged opening 13 of a wrench element 14. When the wrench element is applied to the nut the pin 12 will engage the channel 11, thereby constituting an abutment for the wrench element, one of the extension cams 15 may bear against the yieldable end 8, and disconnect it from its tooth by rocking the wrench element. When the yieldable end 8 is disengaged from the tooth, the wrench element may be turned and the nut removed. In fact, the nut is moved intermittently, when the wrench element is correspondingly manipulated. The wrench element at its end opposite the ends having the opening is provided with a pair of forks 15ª, which may be used to straddle the nut 4, whereby the ribs 17 may engage diametrically opposite portions of the channel 11, after which one of the extremities 18 of the forks may contact with the yieldable end 8, in order to detach it from its ratchet teeth, after which the nut may be removed by means of the wrench element.

In Fig. 4, the nut is provided with diametrically opposite cylindrical depressions 19, to be engaged by lugs 20, which are carried by leaf springs 21, which are secured to the opposite outer portions of the ring part of the wrench element. The lugs 20 engage through the ring part and into the depressions 19, then the wrench element 22 in Fig. 6 is moved so that one of the projections 15 may engage the yieldable or spring end 8 and detach it from engagement with its tooth on the inner face of the nut.

The invention having been set forth, what is claimed as new and useful is:

1. In a device as set forth, the combination with a nut and a member to be locked, of a locking element having a spring tongue provided with a locking engagement with said nut to lock the same, said nut having means formed in its marginal edge and in surrounding relation to fulcrumly receive a releasing tool, whereby said tool is adapted to release said spring tongue out of engagement with said nut.

2. In a device as set forth, the combination with a pair of members to be locked, of a locking element having a spring tongue provided with a locking engagement with one of said members to lock the same, one of said locking members having a groove in surrounding relation provided at intervals with corner bearings, on which a releasing tool may fulcrumly engage, whereby said tool is adapted to release said spring tongue from locking engagement with one of said members.

3. In a device as set forth, the combination with a pair of members to be locked, of a locking element having a spring tongue provided with a locking engagement with one of said members to lock the same, one of said locking members having corner bearings at intervals, certain of which being adapted to be engaged by a releasing tool, whereby said tool is adapted to release the spring tongue out of contacting engagement with one of said locking members.

4. In a device as set forth, the combination with a nut and a member to be locked, of an element having an offset spring tongue having contacting engagement with said nut, one of said members having bearings, said bearings being arranged at intervals about and formed in the surface of said nut and in a plane offset from the spring tongue, whereby a releasing tool may fulcrumly engage certain of said bearings, whereby part of said tool may contact with the tongue and disengage it from said nut.

In testimony whereof I hereunto affix my signature.

EDWARD F. SCHWORM.